May 10, 1932. O. LUNDELL Re. 18,458

BROACH

Original Filed Nov. 29, 1926

INVENTOR
Otto Lundell.
BY
Harness, Dickey, Pierce & Mann
ATTORNEYS.

Reissued May 10, 1932

Re. 18,458

UNITED STATES PATENT OFFICE

OTTO LUNDELL, OF DETROIT, MICHIGAN, ASSIGNOR TO COLONIAL TOOL COMPANY, OF DETROIT, MICHIGAN, A CORPORATION OF MICHIGAN

BROACH

Original No. 1,708,478, dated April 9, 1929, Serial No. 151,338, filed November 29, 1926. Application for reissue filed December 26, 1930. Serial No. 504,963.

It is the primary object of my invention to provide means for lessening the amount of effort necessary to be exerted in pulling a broach, having cutting teeth thereon, through the work being operated upon. It is quite customary in the conventional building of broaches to provide the sides of the cutting teeth with straight faces. These straight faces bear against the sides of the splines or the like which are being cut by the teeth and add greatly to the amount of effort necessary to pull the broach through the work. This is particularly true when the broach has become heated so as to expand to a greater than normal width.

It is therefore an object of my invention to relieve the sides of the teeth, longitudinally of the broach, in proportion to the height of the cutting teeth so as to provide a nearly constant side bearing portion for the teeth and a non-bearing portion on the sides of the teeth which increases as the height of the teeth increases.

With the above and other objects in view, my invention consists in the arrangement, combination and construction of the various parts of my improved device, as described in the specification, claimed in my claims, and shown in the accompanying drawings, in which:

Figures 1, 2, 3, 4:
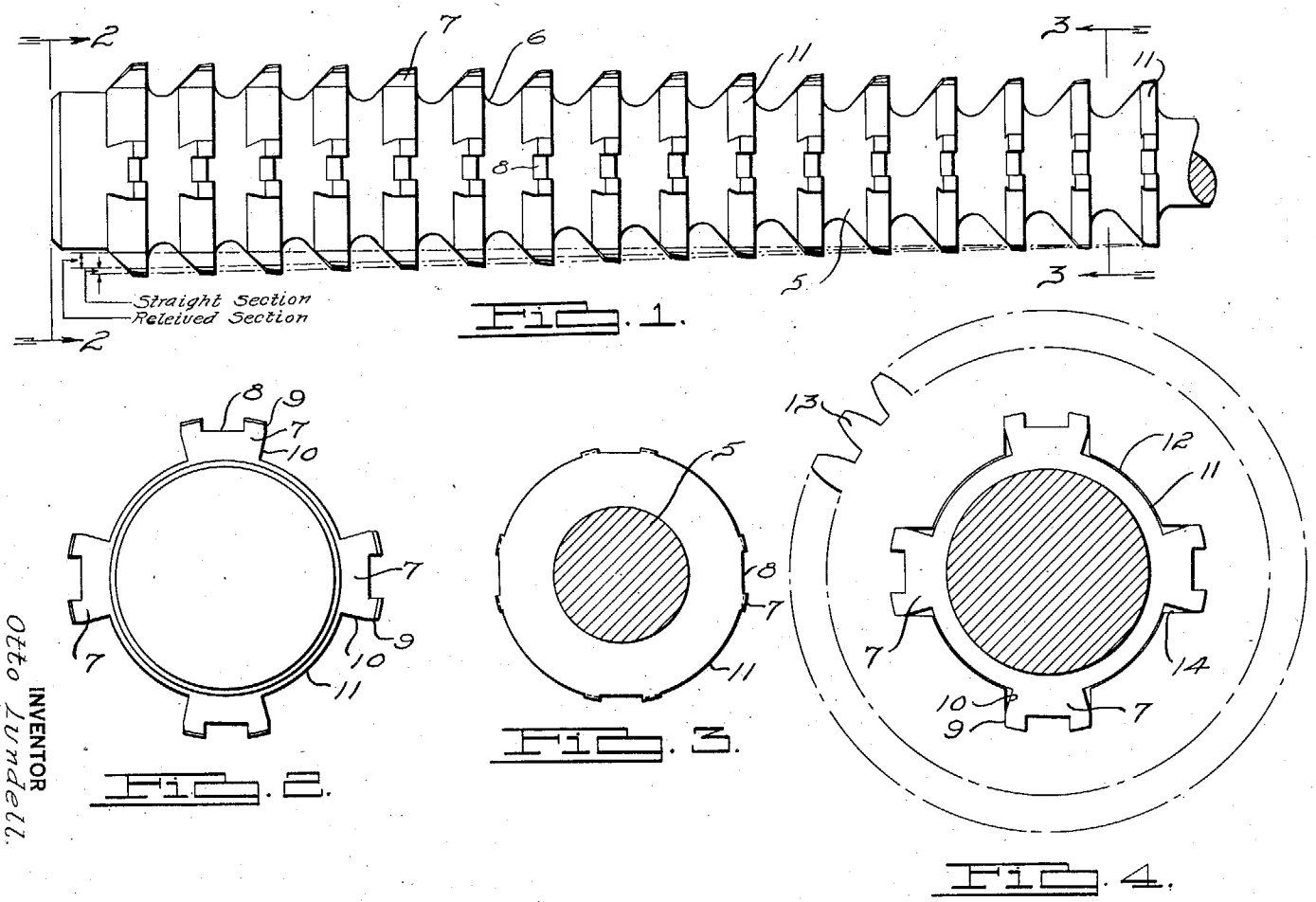
Fig. 1 is an elevation of a broach embodying my invention.
Fig. 2 is a sectional view taken on line 2—2 of Fig. 1.
Fig. 3 is a sectional view taken on line 3—3 of Fig. 1.
Fig. 4 is a broken plan view of a finished work piece illustrating the cutting operation performed by my broach.

I have shown a broach provided with a conventional central portion 5, chip receiving channels 6 and teeth 7. The teeth 7 may be provided with central reliefs or cut away portions 8, but it is to be understood that the teeth may be flat or of arcuate shape as conventionally employed in the art.

As is usual the teeth 7 increase in height or depth from the front to the rear of the broach. This increase in height or depth is clearly illustrated by the two cross sectional views shown in Figs. 2 and 3, wherein the webs 11 are of equal diameters being slightly less than the diameter of a hub 12 of the gear 13 as shown in Fig. 4. In this construction the entire area of the hub and the splines is substantially filled by the webs and the teeth of the broach during the splining operation. The material machined from the base of the spline falls within the chip receiving channels 6 which carry it outside of the confines of the hub.

As the depth of the teeth 7 increases toward the finishing end of the broach, a considerable depth is attained and if the sides of the teeth are straight so as to bear in the sides of the splines which are being cut, a considerable friction is set up with a consequent increase in the amount of effort required to pull the broach through the work. As is clearly shown, however, in Fig. 2 the teeth are provided with relatively short straight portions and relatively long relieved or inwardly tapered portions 10 which relieved or inwardly tapered portions do not bear against the splines being cut. It is to be understood that the relieved or tapered portion may be of any form to effect a recess below the short straight or cutting portion of the teeth to provide a clearance between the sides of the teeth and the sides of the spline from the base of the teeth to its cutting edge. As is clearly shown by the longitudinal lines in Fig. 1, the depth of the relieved or inwardly tapered portions on the various teeth decreases from the final to the initial cutting end of the broach. The straight or unrelieved portion remains substantially constant until teeth are of such shallowness as to bring the side portions thereof substantially to a point, as is clearly shown in Fig. 3.

The hub 12 of the gear 13 is illustrated as having four equally spaced slots or splines 14 cut in its inner periphery by my broach in a single operation. By having the teeth of the broach recessed, the four splines may be cut at the same time with comparative ease since all of the applied force is equally distributed along the top and side cutting edges of the four rows of teeth and is entirely utilized for the cutting operation.

The teeth 7 occupy substantially the entire area of the spline 11 and since the engagement between my broach and the gear 13 occurs only at the cutting portion of the teeth, it will be readily apparent that the recess or reliefs formed below the cutting portions prevent a frictional engagement between the sides of the teeth and the splines when the teeth expand in the presence of the heat generated at their cutting edges. It is to be understood that the word "recess", is employed in a broad sense, that of providing relieved sides to a tooth at a height from the base within which preceding teeth are provided with side cutting edges.

This theory of relieving the teeth against frictional contact with the major portion of the side walls of the groove cut by the preceding teeth may, of course, be applied to broaches having teeth of an entirely different shape from that illustrated, and likewise the invention may be applied to broaches of different style and construction from that shown and irrespective of the number of rows of cutting teeth on the broach.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A broach or the like having a plurality of teeth provided with cutting end portions, a portion of the sides of said teeth being straight and a portion thereof tapering inwardly, the straight portions being adjacent the cutting ends of the teeth, and the tapering portions being of increasing depth toward the finishing end of the broach.

2. A broach or the like having a plurality of teeth provided with cutting end portions, a portion of the sides of said teeth being straight and a portion thereof tapering inwardly, the straight portions being adjacent the cutting ends of the teeth and being of substantially the same depth on substantially all of the teeth and the tapering portions being of increasing depth toward the finishing end of the broach.

3. A broaching tool for cutting a groove in a member, said tool having a body portion upon which a plurality of cutting teeth are provided in a row, cutting edges on the top of said teeth which extend a slight distance on the sides thereof, the sides of the teeth below the top side cutting edges and outwardly of said body portion being of less width than the width of the side cutting edges of preceding teeth.

4. A broaching tool for cutting a groove in a member, said tool including a body portion upon which a plurality of cutting teeth are provided in a row, cutting edges on the top and the two sides of each tooth provided in such manner that substantially all of the side edges of the teeth inwardly of the cutting edges and outwardly of said body portion are cut away to relieve the said cut away sides from contact with a plane tangent to the side cutting edges of the preceding teeth.

5. A broaching tool for cutting a groove in a member including a body portion on which a row of teeth is provided of gradually increasing height from one end of the tool to the other, cutting edges on the top of said teeth which extend a short distance on each side thereof in such manner as to have the side cutting edges of adjacent teeth provide a continuous contour and have the portion of the teeth below the side cutting edges of less width than the side cutting edges of preceding teeth.

6. A broaching tool provided with a row of teeth for cutting a groove in a member, cutting edges on the top of the teeth in progressive offset relation to each other relative to the axis of the tool, the sides of the teeth below the top cutting edges and outwardly of the body of the tool being of less width than the width of the cutting edges of preceding teeth.

7. A broaching tool provided with a row of teeth for cutting a groove in a member, cutting edges on the top of the teeth in progressive offset relation to each other relative to the axis of the tool, the sides of the teeth below the top cutting edges and outwardly of the body of the tool being relieved inwardly from the portions of the groove cut by preceding teeth.

8. A broaching tool for cutting a plurality of grooves in a member, said tool having a body portion upon which a plurality of cutting teeth are provided in rows, cutting edges on the top of said teeth which extend a slight distance on the sides thereof, the side cutting edges of one tooth being a continuation of the side cutting edges of an adjacent tooth and the sides of the teeth below the side cutting edges being of less width than the width of the side cutting edges of preceding teeth.

9. A broaching tool having a row of teeth of increasing height thereon which conforms to the shape of the groove to be cut, a cutting edge on the top portion of each tooth which extends downwardly on each of its sides a distance short of the length of the tooth, the portion of the sides of the teeth below their cutting edges and outwardly of the body of the tool being of less width than the width of the groove cut by the side cutting edges of preceding teeth.

10. A broaching tool for cutting a groove in a member comprising a body portion on which a row of teeth is provided which gradually increase in height from one end of the tool to the other, the sides of said teeth located outwardly of the body of the tool being relieved from contact with the major portion of the side walls of said groove as cut by the preceding of said teeth.

11. A broaching tool for cutting a plurality of grooves in a member comprising a body portion on which a plurality of rows of teeth are provided which gradually increase in height from one end of the tool to the other, the sides of said teeth located outwardly of the body of the tool being relieved from contact with the major portion of the side walls of said grooves as cut by preceding teeth of each row.

In testimony whereof I have hereunto subscribed my name this 24th day of December, 1930.

OTTO LUNDELL.